United States Patent
Okoli et al.

(10) Patent No.: US 9,274,025 B2
(45) Date of Patent: Mar. 1, 2016

(54) TRIBOLUMINESCENT OPTICAL FIBER SENSOR

(71) Applicant: FLORIDA STATE UNIVERSITY RESEARCH FOUNDATION, INC., Tallahassee, FL (US)

(72) Inventors: Okenwa Okoli, Tallahassee, FL (US); David Olawale, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 694 days.

(21) Appl. No.: 13/656,246

(22) Filed: Oct. 19, 2012

(65) Prior Publication Data

US 2013/0098164 A1  Apr. 25, 2013

Related U.S. Application Data

(60) Provisional application No. 61/549,457, filed on Oct. 20, 2011.

(51) Int. Cl.
| | |
|---|---|
| *G01M 11/08* | (2006.01) |
| *G02B 6/02* | (2006.01) |
| *G01M 5/00* | (2006.01) |
| *G01L 1/24* | (2006.01) |

(52) U.S. Cl.
CPC ............... *G01M 11/083* (2013.01); *G01L 1/24* (2013.01); *G01M 5/0008* (2013.01); *G01M 5/0033* (2013.01); *G01M 5/0091* (2013.01); *G02B 6/02033* (2013.01); *Y02B 10/30* (2013.01)

(58) Field of Classification Search
CPC ............ G01M 11/083; G01M 5/0008; G01M 5/0033; G01M 5/0091; G02B 6/02033; G01L 1/24

See application file for complete search history.

(56) References Cited

U.S. PATENT DOCUMENTS

| | | |
|---|---|---|
| 5,905,260 A | 5/1999 | Sage et al. |
| 6,581,474 B2 | 6/2003 | Goods et al. |
| 6,710,328 B1 | 3/2004 | Mastro et al. |
| 6,820,496 B2 | 11/2004 | McElhanon et al. |
| 7,270,770 B2 | 9/2007 | Sage et al. |
| 7,541,509 B2 | 6/2009 | Sigmund et al. |
| 2004/0233347 A1* | 11/2004 | Sage et al. ...................... 349/56 |
| 2008/0248235 A1 | 10/2008 | Feng et al. |
| 2009/0246507 A1 | 10/2009 | Graham, Jr. et al. |

OTHER PUBLICATIONS

Sage et al., "Getting light through black composites: embedded triboluminescent structural damage sensors," Smart Mater. Struct. 10 (2001) pp. 332-337.*

(Continued)

*Primary Examiner* — Lisa Caputo
*Assistant Examiner* — Punam Roy
(74) *Attorney, Agent, or Firm* — Sutherland Asbill & Brennan LLP (57) ABSTRACT

A sensor that can be used for in-situ structural health monitoring with a triboluminescent material provided on a portion of an optical fiber that may be embedded in materials to be structurally monitored. Damage to the monitored material may result in a triboluminescent emission from the triboluminescent material that can be guided via the optical fiber. Analysis of the triboluminescent emission may provide information on the occurrence, severity and location of damage in a structure.

23 Claims, 7 Drawing Sheets

(56) References Cited

OTHER PUBLICATIONS

Bourhill, G., et al. "The solid-state photoluminescent quantum yield of triboluminescent materials." Chemical physics letters 336.3 (2001): 234-241.*

Xu, C. N., et al. "Preparation and characteristics of highly triboluminescent ZnS film." Materials research bulletin 34.10 (1999): 1491-1500.*

Xu, Chao-Nan. "Coatings." Encyclopedia of Smart Materials (2002).*

Walton, "Triboluminescence," Advances in Physics, vol. 26, No. 6, pp. 887-948; Jul. 1977.

Kulak et al., "Photoelectrochennical Behaviour of TiO2-Modified Carbon-Fibre Electrode Assembly," proceedings of the 10th Workshop on Quantum Solar Energy Conversion, 1998.

Sage et al., "Triboluminescent Damage Sensors," Smart Mater. Struct. 8, 1999, pp. 504-510.

Holgate, "Glowing Report," New Scientist, Issue 2204, Sep. 18, 1999.

Sage et al., "Getting Light Through Black Composites: Embedded Triboluminescent Structural Damage Sensors," Smart Mater. Struct. 10, 2001, pp. 332-337.

Bourhill et al., "The Solid-State Photoluminescent Quantum Yield of Triboluminescent Materials," Chemical Physical Letters 336, 2001, pp. 234-241.

Okafor et al., "Detection and Characterization of High-Velocity Impact Damage in Advanced Composite Plates Using Multi-Sensing Techniques," Elsevier: Composite Structures 54, 2001, pp. 289-297.

Burda et al., "Enhanced Nitrogen Doping in TiO2 Nanoparticles," Nano Letters 2003, vol. 3, No. 8, pp. 1048-1051; May 22, 2003.

Lee, "Photocatalytic Nanocomposites Based on TiO2 and Carbon Nanotubes," The Graduate School of the University of Florida, 2004.

Watkins et al, "Single Wall Carbon Nanotube-Based Structural Health Sensing Materials," NASA Langley Research Center, NSTI-Nanotech 2004, www.nsti.org, ISBN 0-9728422-9-2, vol. 3, 2004.

Yang et al., "Electrophoresis Coating of Titanium Dioxide on Aligned Carbon Nanotubes for Controlled Syntheses of Photoelectronic Nanomaterials," Advanced Materials 2007, 19, pp. 1239-1243.

Dickens et al., "Harnessing Triboluminescence for Structural Health Monitoring of Composite Structures," High Performance Materials Institute, Florida A&M University—Florida State University, May 20, 2008.

Non-Final Office Action for related U.S. Appl. No. 12/691,537 mailed Dec. 22, 2011.

Final Office Action for related U.S. Appl. No. 12/691,537 mailed Mar. 9, 2012.

Non-Final Office Action for related U.S. Appl. No. 12/691,537 mailed Jul. 18, 2012.

\* cited by examiner

TRIBOLUMINESCENT OPTICAL FIBER SENSOR

CROSS REFERENCE TO RELATED APPLICATIONS

The present application claims priority to U.S. Provisional Application No. 61/549,457, filed Oct. 20, 2012, entitled TRIBOLUMINESCENT OPTICAL FIBER SENSOR and is related to U.S. application Ser. No. 12/691,537, filed Jan. 21, 2010, entitled SYSTEMS, METHODS, AND APPARATUS FOR STRUCTURAL HEALTH MONITORING. The disclosure of the same is hereby incorporated by reference in its entirety.

FIELD OF THE INVENTION

This invention generally relates to sensors, and more particularly to triboluminescent optical fiber sensors.

BACKGROUND OF THE INVENTION

Structural health monitoring (SHM) of composite structures made from fiber reinforced polymer (FRP), concrete, and/or other materials can improve the safety of physical infrastructure. FRP composites, in particular, continue to find increasing use in structural applications in the aerospace and marine industries, as well as in wind turbine blades and civil infrastructural systems. This has largely been enabled by their relatively high strength to weight ratios, and excellent fatigue and corrosion resistance. They are however susceptible to low velocity impact resulting in barely visible impact damage (BVID). Similarly, key civil infrastructure systems (CIS) like bridges, dams, roads and buildings made of cementitious composites like concrete are continually exposed to natural degradation because of old age, over loading and seismic activities. They are also exposed to man-made damage from terrorist attacks and impact collisions.

There are currently a number of techniques being used for damage detection and monitoring of composite structures. These include imaging techniques such as ultrasonic cross sectional scan (C-scan), x-ray, and thermography. These techniques, however, do not provide for in-situ sensing of damage and/or fractures, and as a result, these techniques do not allow for reliable real-time monitoring of structures. Furthermore, the associated costs resulting from the downtime required for periodic non-destructive inspections can be very high for aerospace structures like aircrafts and civil structures like bridges. Acoustic emission techniques are promising, but suffer from low-signal-to-noise ratio. Surface-mounted resistive foil strain gages have potential for in-situ and continuous monitoring, however, they are less effective in monitoring internal delamination and/or damage and are vulnerable to electromagnetic and electrical interference, as well as physical damage.

Triboluminescence (TL) is the emission of light from materials when stressed, pulled apart, ripped, scratched, rubbed, or fractured. There have been a number of attempts to apply the TL phenomenon for damage sensing in composite structures. A challenge of applying TL-based sensor systems is the ability to effectively capture and transmit an optical signal generated within opaque composites like concrete and carbon fiber reinforced polymers. Other factors critical to the effective implementation of TL damage sensing include the effective dispersion of TL materials and the determination of optimized concentration levels in the host materials.

An approach being employed is to incorporate TL crystal into resin and infuse through the fiber layup in which optical fibers (for signal transmission) have been placed. The whole part is then cured. There are however many limitations with this approach. Firstly, the concentration level of the TL crystals in the host matrix required for good TL response is usually high. This introduces parasitic weight effect which is highly undesirable. The density differences between the TL crystals and resin matrix may also cause the settling of the crystals during curing. There will therefore be uneven dispersion of the crystals in the cured composite part or structure. Another problem associated with this approach is filtration during the infusion process.

An alternative approach requires the incorporation of TL crystals in a polymer to produce thin films. The films are then placed on the surface of composite laminates to monitor surface damage. In this case however, signal transmission may be an issue. Furthermore, placing the thin film within a laminate may promote delamination at the laminate interfaces.

BRIEF SUMMARY OF THE INVENTION

In certain embodiments, an apparatus can include an optical fiber with an outer surface extending a length of the optical fiber and a first portion and a second portion along the length of the optical fiber. A triboluminescent material can be provided on the outer surface in the first portion of the optical fiber, wherein the triboluminescent material provides an optical emission when subjected to an emitting condition and at least a portion of the optical emission is received by the first portion of the optical fiber and guided through the second portion of the optical fiber.

In other embodiments, a system can include a host material, at least one sensor embedded within the host material, and at least one photodetector, wherein each of the at least one photodetector is optically coupled to each of the at least one sensor. Each of the at least one sensor may include an optical fiber with an outer surface extending a length of the optical fiber and a first portion and a second portion along the length of the optical fiber and a triboluminescent material provided on the outer surface in the first portion of the optical fiber. The triboluminescent material may provide an optical emission when subjected to an emitting condition and at least a portion of the optical emission may be received by the first portion of the optical fiber and guided through the second portion of the optical fiber.

In further embodiments, a method can include providing an optical fiber comprising an outer surface extending a length of the optical fiber and a first portion and a second portion along the length of the optical fiber and providing a triboluminescent material on the outer surface in the first portion of the optical fiber and communicatively coupling the second portion of the optical fiber to at least one photodetector so the triboluminescent material emits an optical emission when subjected to an emitting condition and at least a portion of the optical emission can be received by the first portion of the optical fiber and guided to the at least one photodetector via the second portion of the optical fiber.

Other embodiments, features, and aspects of the invention are described in detail herein and are considered a part of the claimed inventions. Other embodiments, features, and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF THE INVENTIONS

Embodiments of the disclosure are described more fully hereinafter with reference to the accompanying drawings, in which embodiments of the invention are shown. This disclosure may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the disclosure may provide systems, apparatus, and methods for in-situ structural monitoring of structural materials, such as composite materials. These systems, apparatus, and methods, may, in certain embodiments, enable continuous monitoring, ability to monitor without substantially changing the composition, mechanical properties, and thermal properties of the monitored material, and increased signal to noise (SNR) of signals indicative of pressure or fracture from the monitoring. In one aspect, the sensor may include an optical fiber where triboluminescent material is coated on to a portion of optical fiber such that any optical emission from the triboluminescent material may be at least partially collected by the optical fiber and guided down the length of the fiber. In another aspect, the sensor may be embedded within the material to be monitored. Therefore, an optical signal indicative of pressure or fracture of monitored material can be transmitted by the sensor embedded inside of the monitored material to outside of the monitored material for post processing by either or both of the optical and electrical processes.

Example embodiments of the invention will now be described with reference to the accompanying figures.

Figure 1:
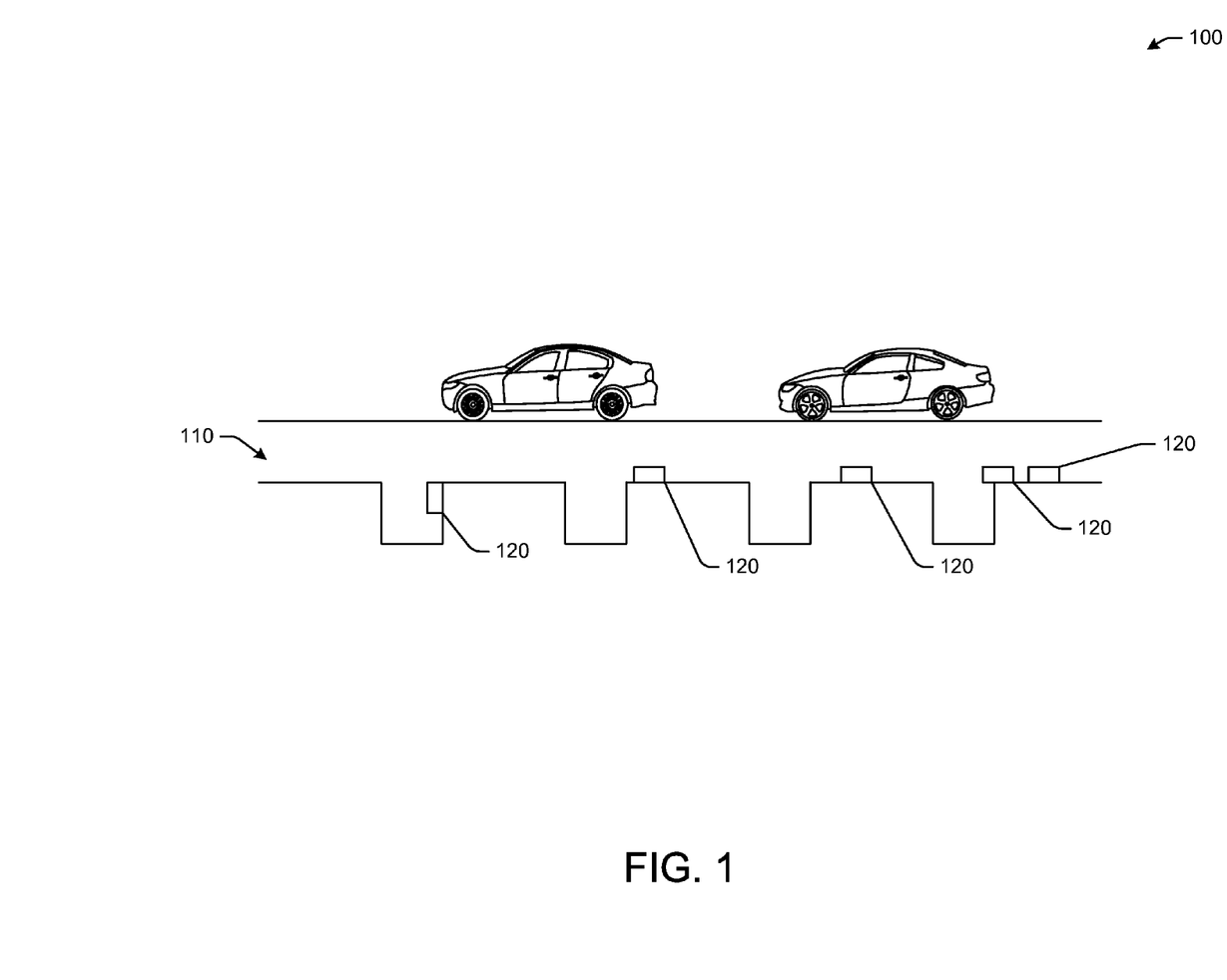
FIG. 1 is a schematic diagram illustrating an example physical infrastructure with triboluminescent optical fiber sensor embedded therein, in accordance with embodiments of the disclosure.

Referring now to FIG. 1, an example physical infrastructure 100, in the form of a bridge 110, with triboluminescent optical fiber sensors 120 embedded therein, in accordance with embodiments of the disclosure, is shown. The triboluminescent optical fiber sensors 120 may be embedded within the bridge 110 in locations where there is relatively higher probability of damage and/or cracking. For example, one or more triboluminescent optical fiber sensors 120 may be provided near the joining portion of the bridge 110 deck and the bridge 110 foundation. In this case, the triboluminescent optical fiber sensors 120 may be embedded within or on concrete, cement, rebar, or other materials used in the construction of the bridge 110.

Therefore, an application of triboluminescent optical fiber sensors 120 is the monitoring of FRP and repair systems in concrete structures such as bridges 110. With the over 600,000 bridges in the United States of America and with an estimated 25 percent being in need of repairs, this sector is in need of in-situ structural monitoring systems such as the triboluminescent optical fiber sensors 120 as described herein. Furthermore, the triboluminescent optical fiber sensors 120 can be used in the FRP to act as an impact sensor system to monitor impact to structures like bridges receive over time. Such information may be used in assessing the structural state of the structure, such as the bridge 110, thereby enabling timely repair and prevention of catastrophic failures.

The triboluminescent optical fiber sensors 120 enable the application of triboluminescence sensing to concrete or cementitious composites. The triboluminescent optical fiber sensors 120 incorporated into concrete, for example, can produce a cementitious composite with in-situ damage, such as crack detection capability. Such a system is often referred to as a triboluminescence multifunctional cementitious composite (TMCC) because of the multifunctional capabilities for both structural (load-carrying) and damage sensing. The energy (impact, fatigue, etc.) which enables crack propagation in the concrete may cause the TMCC to produce corresponding signals indicative of damage or damage-causing events. This may find ample application in monitoring cracks in the hundreds of thousands of concrete bridges and structures in the United States and beyond. Any abnormal crack initiation caused by impacts and overload may cause the TMCC to emit signals indicative of the damage and damaging event.

Figure 2:
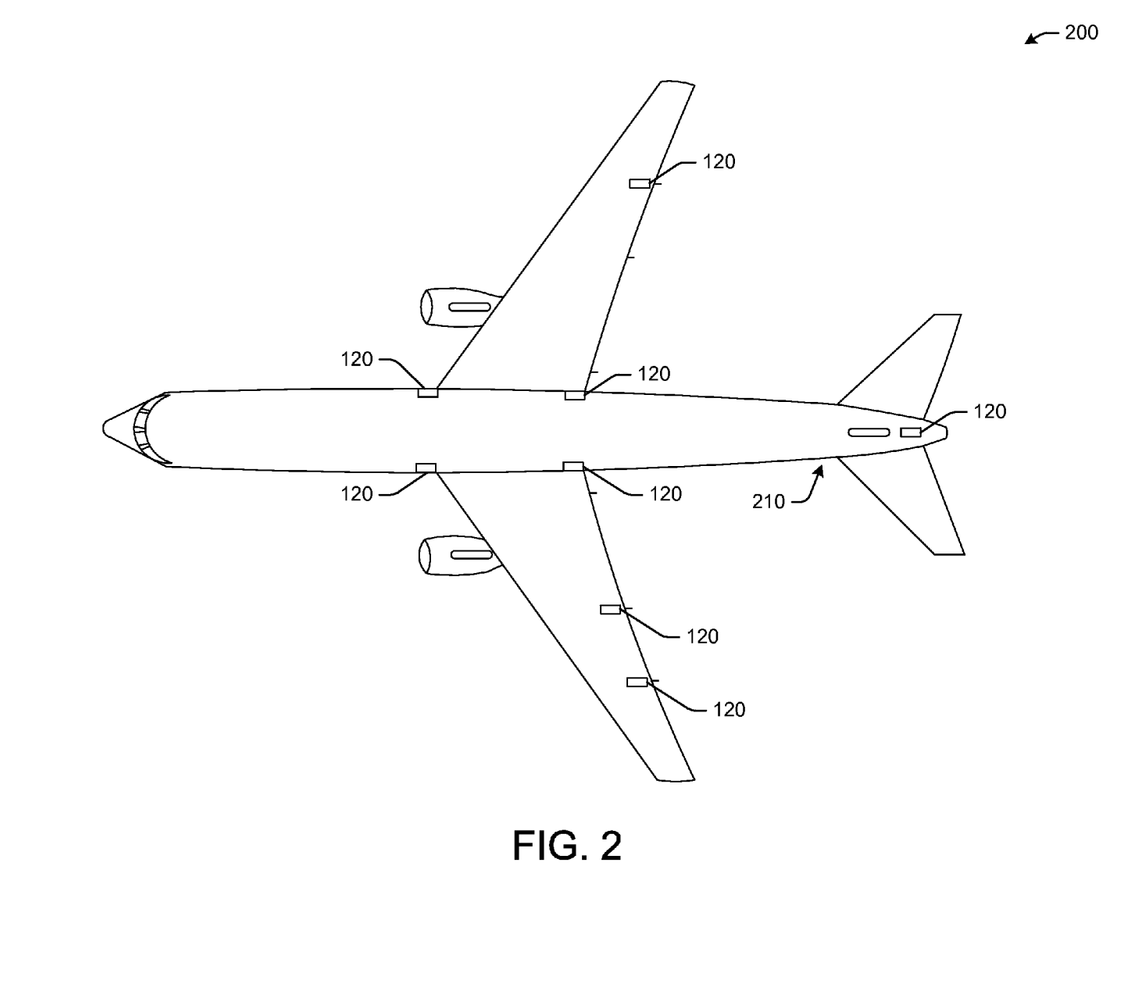
FIG. 2 is a schematic diagram illustrating an example aircraft with triboluminescent optical fiber sensor embedded therein, in accordance with embodiments of the disclosure.

Similar to FIG. 1, in FIG. 2, an example transport vehicle 200 in the form of an aircraft 210 with triboluminescent optical fiber sensors 120 embedded therein, in accordance with embodiments of the disclosure, is shown. The triboluminescent optical fiber sensors 120 may be embedded in the regions on the aircraft that may be relatively more prone to mechanical failure. For example, one or more triboluminescent optical fiber sensors 120 may be provided in or around the portions where the aircraft 210 wings are fixed to the aircraft 210 body. In some cases, the triboluminescent optical fiber sensors 120 may be embedded within or on the surface of the frame and/or body of the aircraft 210. Some of these regions to be monitored may experience relatively higher levels of mechanical stresses and/or fatigue. The triboluminescent optical fiber sensor 120 may be configured to detect one or more emitting conditions associated with the region being monitored around the embedded triboluminescent optical fiber sensor 120. The emitting conditions may be any one of events that impart a force onto the triboluminescent optical fiber 120.

Other applications of triboluminescent optical fiber sensors 120 may include, but are not limited to, security, transportation infrastructure, transportation vehicles, housing, or the like. For example, embodiments of the disclosure may provide protection of infrastructure, including concrete structures like bridges and dams from terrorist attacks via impacts and explosion. As another example, bridge owners such as government or private entities may remotely, securely, and efficiently monitor and/or predict the structural integrity of bridges and/or roadways. As yet another example, commercial airline operators may implement real-time monitoring of aircrafts resulting in reduced labor, maintenance cost, and downtime, while providing greater security and safety. Triboluminescent optical fiber sensors 120 may further be used in the aerospace industry to provide real time distributed monitoring of the structural states of aircrafts from damaging events such as low velocity impact damage.

Figure 3:
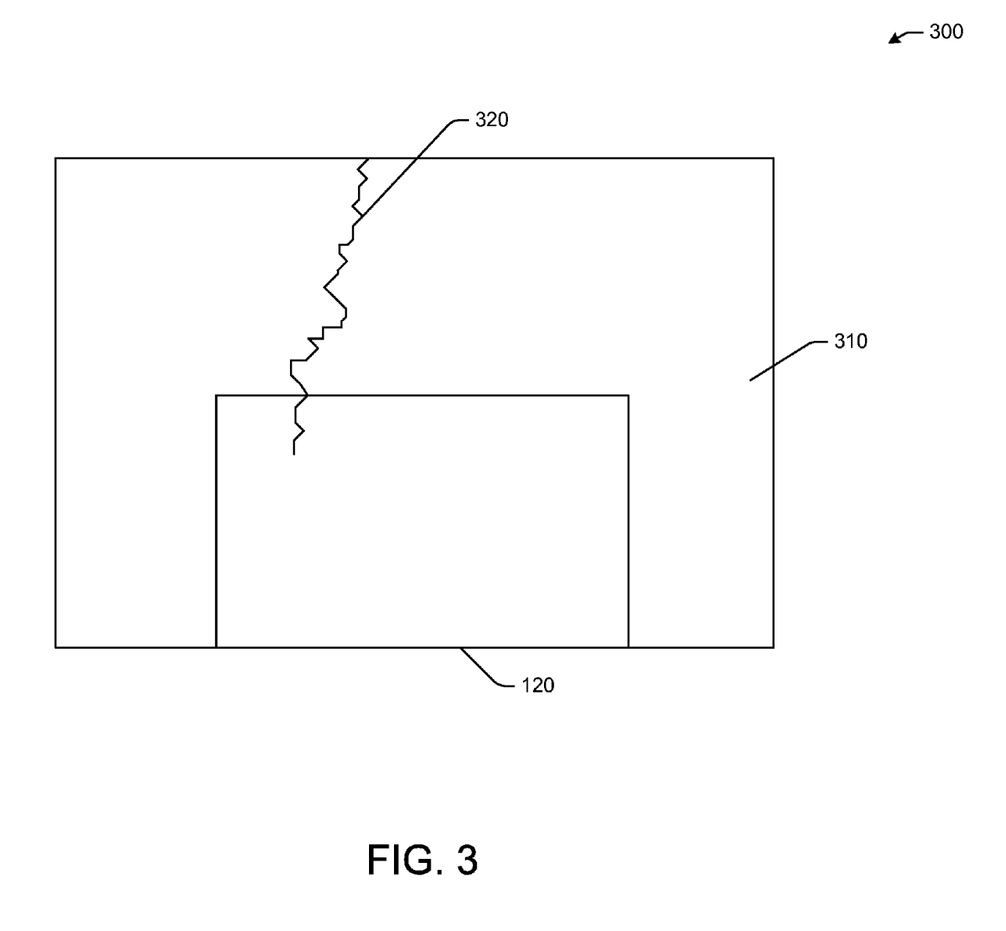
FIG. 3 is a schematic diagram illustrating an example crack propagating into the triboluminescent optical fiber sensor(s) of FIGS. 1 and 2, in accordance with embodiments of the disclosure.

Referring now to FIG. 3, with continuing reference to FIGS. 1 and 2, a triboluminescent optical fiber sensor 120 embedded within or on a surrounding material 310 experiencing an emitting condition, in the form of a propagating crack 320 is shown. The surrounding material 310 may be, for example, cement used in the construction of the bridge 110 or aluminum used in the construction of the aircraft 210. In this case, the crack 320 may propagate to the triboluminescent optical fiber sensor 120 or in proximity thereof. In other words, in certain embodiments, the triboluminescent optical fiber sensor 120 may be configured to detect damage, such as the crack 320, within the surrounding material 310 without the damage propagating into the triboluminescent optical fiber sensor 120 itself. In other embodiments, the damage to the surrounding material 310 may lead to damage to the triboluminescent optical fiber sensor 120, as is depicted in FIG. 3. The triboluminescent optical fiber sensor 120 may be configured to detect when the triboluminescent optical fiber sensor 120 and the triboluminescent materials thereon are stressed, pulled apart, ripped, scratched, rubbed and/or fractured. Indeed, the triboluminescent optical fiber sensor 120 may be configured to detect any variety of mechanical force(s) imparted thereon. Therefore, in one aspect, damage to the surrounding material 310 may be detected utilizing the triboluminescent optical fiber sensor 120. In another aspect, force(s) that may contribute to structural damage of the surrounding material 310 may be detected utilizing the triboluminescent optical fiber sensor 120. Forces imparted to the surrounding material 310 may lead to structural damage to the surrounding material 310 in a relatively catastrophic manner and/or in a manner that may progress over time, such as material fatigue or related processes.

It will be appreciated that in certain embodiments, the surrounding material 310 may be subjected to loading and/or unloading of stresses, either or both tensile or compressive, that may lead to fatigue, creep, or other forms of structural damage to the surrounding material 310 over time. The triboluminescent optical fiber sensor(s) 120 in proximity to the surrounding material 310 may be configured to detect these stresses over time and may be configured to provide information related to these stresses to a structural health monitoring system that may track these stresses over time. Indeed, data and/or information from structurally embedded triboluminescent optical fiber sensors 120 may be utilized to make predictions related to crack formation, propagation, and/or structural failure.

Figure 4:
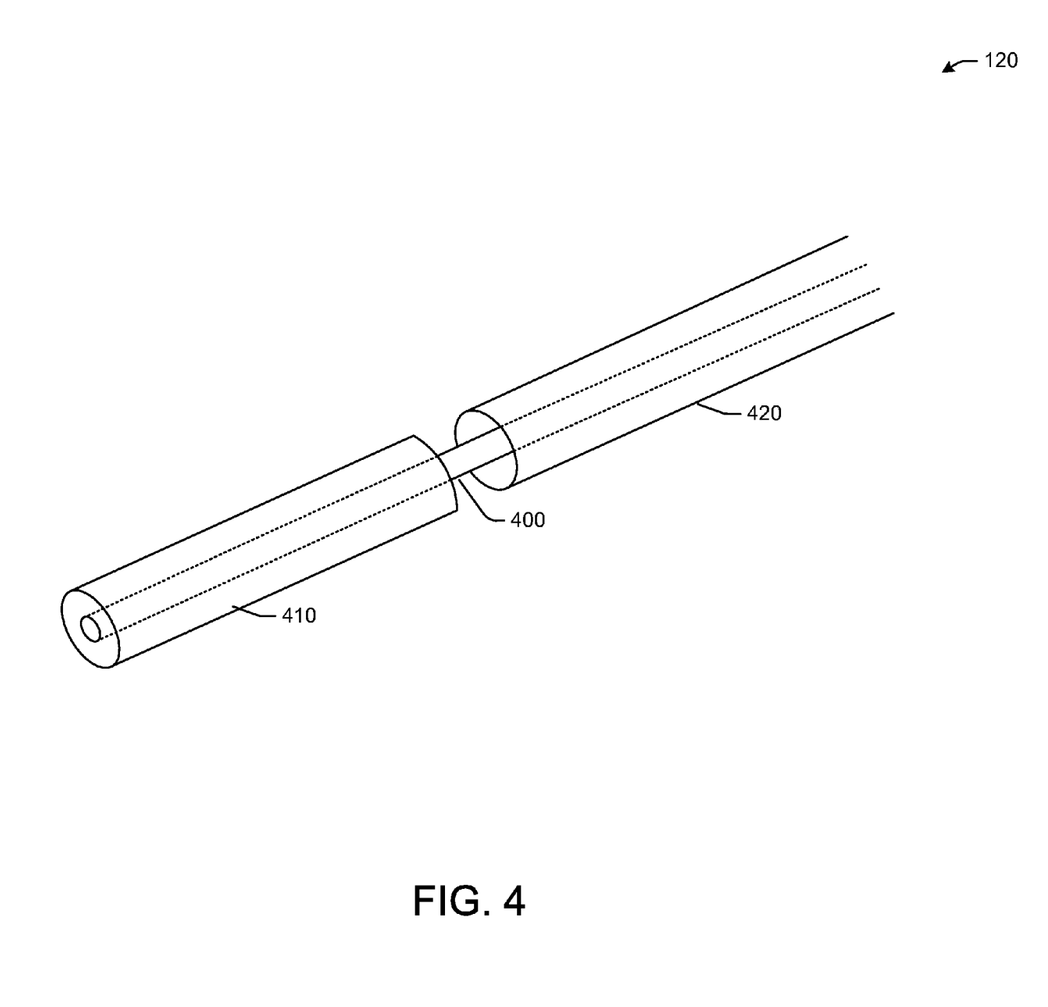
FIG. 4 is a schematic diagram illustrating an example triboluminescent optical fiber sensor, in accordance with embodiments of the disclosure.

Referring now to FIG. 4, an example triboluminescent optical fiber sensor 120 in accordance with embodiments of the disclosure is discussed. The triboluminescent optical fiber sensor 120 may include an optical fiber (OF) 400, such as a polymer optical fiber (POF), with a jacket 420, and a highly sensitized section, called a triboluminescence sensory receptor (TSR) 410.

The OF 400 may be cylindrical in shape, with two ends and a substantially circular shape along its length. The OF 400 may be any suitable type of OF 400 including, but not limited to, single mode fiber, multi-mode fiber, POF, glass fiber, silica based fiber, fluorinated glass fiber, coated fiber, or the like. In general, the OF 400 may include a core surrounded by a cladding region. The OF 400 may further be configured to accept light at magnitudes and wavelength(s) that may be emitted by the TSR 410, via the end and/or the sidewalls of the OF 400. The OF 400 may still further be configured to propagate light, such as light at the wavelength(s) emitted by the TSR 410, along the length of the OF 400. In one aspect, light may be propagated along the length of the OF 400 due to total internal reflection (TIR) of the lights within the OF 400. Therefore, the refractive indexes selected for the core and the cladding of the OF 400 may be suited, in certain embodiments, for allowing TIR at the wavelength(s) of light emitted by the TSR 410. The OF 400 may generally be covered on its outer surface by the jacket 420 at least for a certain portion of the length of the OF 400. The jacket 420 may be any suitable material including plastics, cloth, paper, or the like.

The TSR 410 may be provided directly on the outer surface of the OF 400 in a portion that is not covered by the jacket 420. In certain embodiments, in the construction of the triboluminescent optical fiber sensor 120, the jacket 420 may be removed from a portion of the OF 400 and that portion may be coated with the TSR 410. In other words, the TSR 410 may be provided by mechanically removing the jacket 420 along a portion of the length of the OF 400, and coating that portion with epoxy containing dispersed triboluminescent materials such as ZnS:Mn crystals to form the TSR 410.

The triboluminescent optical fiber sensor 120 may be embedded in a composite structure, as shown in FIGS. 1-3, and can detect damage in the composite structure by converting mechanical energy resulting from a damage causing event like impacts and crack propagation into triboluminescent (TL) optical signals at the TSR 410. The TSR 410, in particular, may be configured to detect mechanical energy and/or mechanical damage in surrounding material with which the triboluminescent optical fiber sensor 120 is embedded and generate an optical output and/or signal. In other words, the TSR 410 may provide mechano-optical energy conversion that may be utilized in the detection of structural damage. In certain embodiments, the entire length (portion) of the optical fiber that is to be incorporated into a structure may be coated with the TSR 410 with the epoxy-triboluminescent mixture. The TL signals generated at the TSR 410 may then be transmitted through the OF 400 to a photodetector, such as a semiconductor photodetector or photomultiplier tube (PMT) and spectrometer.

The TSR 410, upon sensing mechanical energy, such as mechanical energy imparted by a damage event in the material surrounding the triboluminescent optical fiber sensor 120, may emit light at one or more characteristic wavelengths or a range of wavelengths. The OF 400 may be configured to receive photons generated by the TSR 410 from the sides of the OF 400 in the portion on which the TSR 410 is provided. The OF 400 may further be configured to guide the light received from the TSR 410 down the length of the OF 400. In other words, the wavelengths of light that may be emitted by the TSR 410 upon detection of suitable mechanical stimulus, may propagate through the cladding and to the core of the OF 400 and may further exhibit TIR to enable the light to propagate down the length of the OF 400. Therefore, when there may be a damage inducing mechanical event to a structure on which the triboluminescent optical fiber sensor 120 is embedded, the TSR 410 my emit an optical signal that is indicative of the damage inducing mechanical event and at least a portion of that optical signal may propagate to and be guided by the OF 400. In certain embodiments, the OF 400 may be configured to propagate the optical signal from the TSR 410 to a photodetecor, such as a semiconductor photodetector or a photomultiplier tube (PMT).

The operation of the triboluminescent optical fiber sensor 120, in certain aspects, may be visualized similarly to that of the sensory receptors in the human nervous system (HNS), where the sensory receptors are able to convert energy of stimuli into nerve impulses that can be transmitted through neurons. The sensitized section, TSR 410, of the triboluminescent optical fiber sensor 120 may act like the sensory receptors, or axon terminals and/or dendrites, of neurons within the HNS while the OF 400 may act like the axon for transmitting the TL optical signal to photodetectors.

Figure 5:
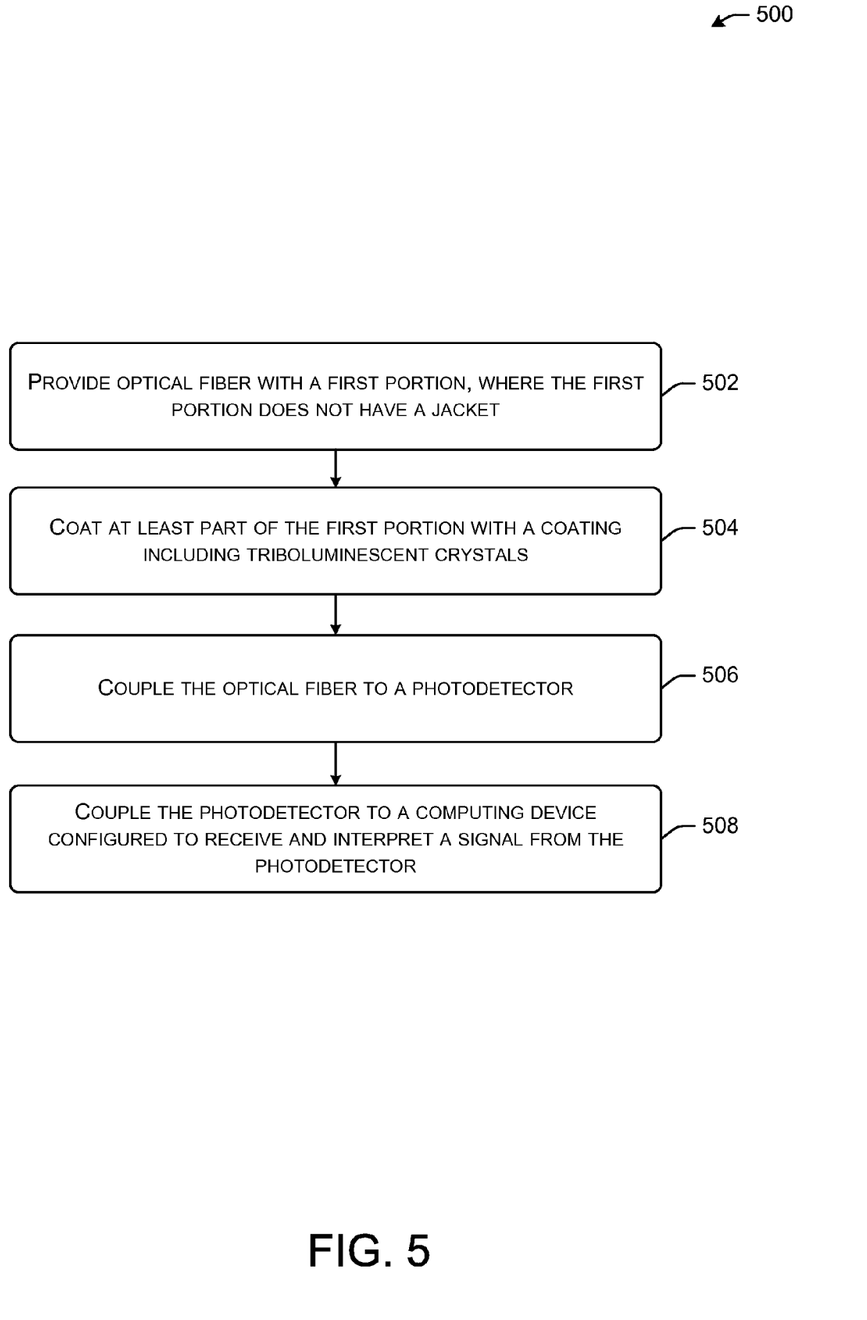
FIG. 5 is a flow diagram depicting an example method of providing a structural health monitoring system incorporating the triboluminescent optical fiber sensor of FIG. 4, in accordance with embodiments of the disclosure.

Referring now to FIG. 5, an example method 500 for providing a structural health monitoring system incorporating the triboluminescent optical fiber sensor 120 is discussed. At block 502, an optical fiber may be provided with a first portion, where the first portion does not have a jacket surrounding the optical fiber. In certain embodiments, OF 400 may have a protective jacket 420 thereon through substantially the full length of the OF 400 and the jacket 420 may be removed in a certain portion, such as on one end of the OF 400. The jacket 420 may be removed using a variety of suitable mechanisms including, but not limited to, mechanical stripping, chemical dissolving, or the like.

At block 504, the at least a part of the first portion of the OF may be coated with a coating including triboluminescent crystals. The coating and/or the triboluminescent material contained therein may, in certain embodiments, be an epoxy dispersed with triboluminescent crystals. For example, the triboluminescent crystals may be any suitable triboluminescent crystals, such as ZnS:Mn crystals, titanium dioxide ($TiO_2$, which is also commonly referred to as "titania"), zinc oxide (ZnO), or magnetite ($Fe_2O_4$), or combinations thereof. In one aspect, the coating on the OF 400 may form the TSR 410 on the first portion of the OF 400. The coating may be provided on the first portion of the OF 400 by dipping the OF 400 in the epoxy dispersed with triboluminescent materials and allowing the epoxy to dry and/or harden. In some cases, the coated epoxy may be heated to accelerate the drying and/or hardening. In certain other embodiments, the triboluminescent materials may be provided on the OF 400 using any suitable process including, but not limited to, chemical vapor deposition (CVD), physical vapor deposition (PVD), evaporative processes, spray processes, or the like.

While the disclosure discusses the use of triboluminescent materials in the coating and in the construct of the TSR 410, it will be appreciated that in certain embodiments, other materials, such as fractoluminous, mechanoluminous, and/or piezoluminous materials may be used. The coating may emit radiation when subject to one or more emitting condition, such as when the triboluminescent material is stressed, pulled apart, ripped, scratched, rubbed, and/or fractured. In some cases, the emitted radiation may be at one or more characteristic wavelength(s) based at least in part on the type of triboluminescent crystals used, stresses imparted to the triboluminescent crystals, the type of matrix or the epoxy in which the triboluminescent crystals are provided, and/or other impurities that may be present in or around the triboluminescent crystals. For example, the triboluminescent crystals used may be a direct bandgap semiconductor material and may have a characteristic wavelength of emissions that is based at least in part on the bandgap of the material.

At block 506, the optical fiber may be coupled to a photodetector. The coupling may enable the OF 400 to provide radiation that is guided by the OF 400 to be transmitted to the photodetector. The photodetector may be any suitable device that converts an optical signal provided thereon to a corresponding electrical signal. The photodetector may include any variety of photodiode, photomultiplier tubes, photovoltaic cells, photoresistors, phototransistors, or the like. In certain embodiments, multi-pixel photodetectors, such as charge coupled devices (CCDs) and/or image sensors may be used. The photodetector may, in certain embodiments, be sensitive to one or more optical wavelength(s) that may be emitted by the TSR 410 provided on the OF 400 of the triboluminescent optical fiber sensor 120.

At block 508, the photodetector may be coupled to a computing device configured to receive and interpret a signal from the photodetector. The computing device may be any device configured to receive the signal from the photodetector and may include any variety of computing devices including, but not limited to, servers, desktop computers, notebook computers, netbook computers, tablet computing devices, pad computing devices, personal digital assistants (PDAs), smart phones, digital readers, or combinations thereof. The computing device may have instructions, applications, and/or software running thereon that may enable the computing device to analyze signals received form the photodetector to provide an indication of events sensed by the triboluminescent optical fiber sensor 120. The computing system is described in greater detail in conjunction with FIG. 6.

It should be noted that the method 500 may be modified in various ways in accordance with certain embodiments. For example, one or more operations of the method 500 may be eliminated or executed out of order in other embodiments. Additionally, other operations may be added to the method 500 in accordance with other embodiments.

Figure 6:
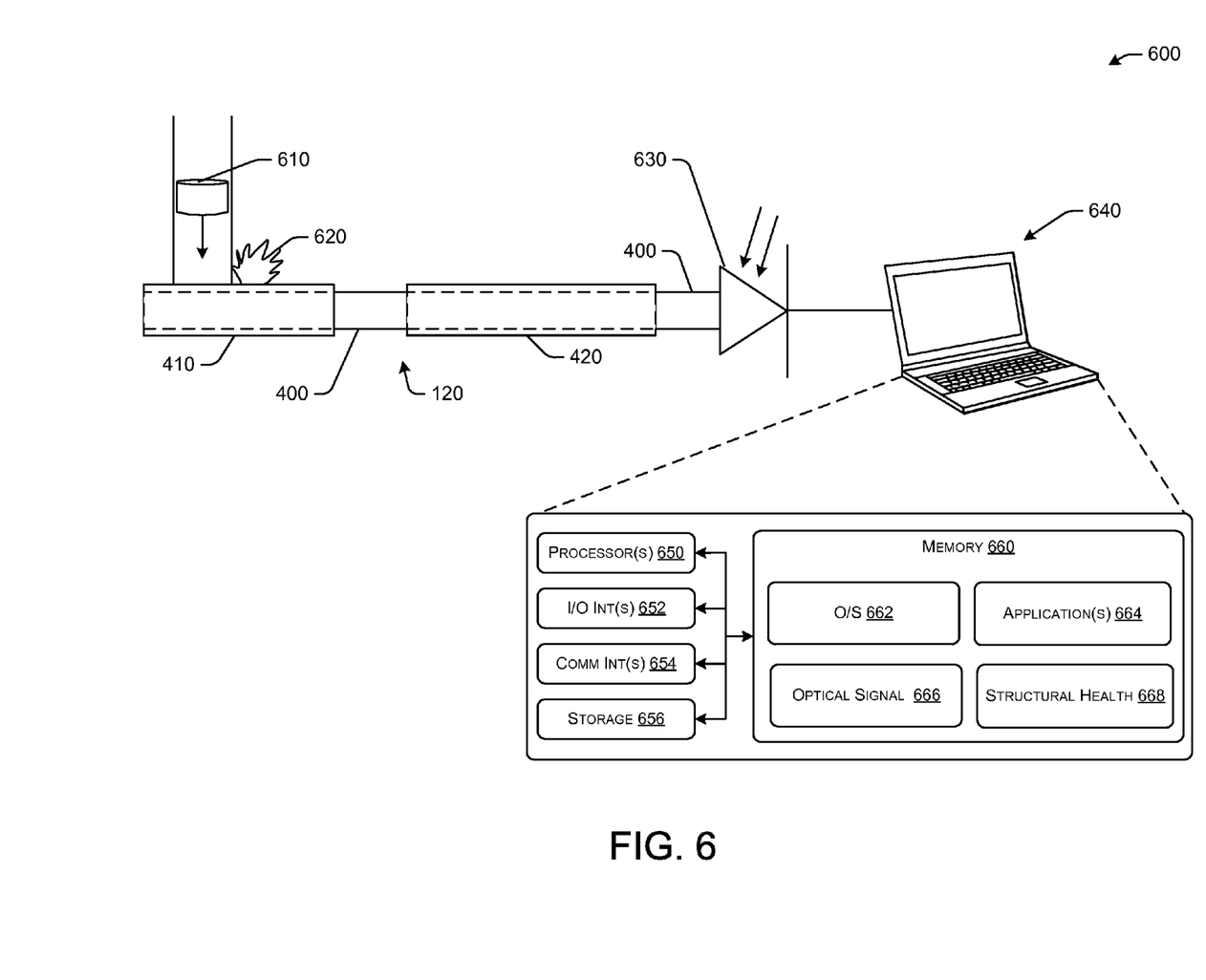
FIG. 6 is a schematic diagram illustrating an example structural health monitoring system incorporating the triboluminescent optical fiber sensor of FIG. 4, in accordance with embodiments of the disclosure.

Referring now to FIG. 6, an example structural health monitoring system 600 incorporating the triboluminescent optical fiber sensor 120, in accordance with embodiments of the disclosure, is discussed. The structural health monitoring system 600 may include the triboluminescent optical fiber sensor 120 coupled to a photodetector 630, which is further coupled to a computing device 640. The triboluminescent optical fiber sensor 120, particularly at the TSR 410 is depicted as sensing an emitting event, in the form of an impact by a weight 610. Although an impact event is depicted here, it will be appreciated that the TSR 410 may be able to detect any suitable mechanical event, such as stressing, being pulled apart, ripping, scratching, rubbing and/or fracturing. The impact may result in an optical emission 620 from the TSR 410, part of which may propagate to the core of the OF 400 and may further be transmitted to the photodetector 630 via the OF 400. While the photodetector 630 is depicted herein as photdetector, it will be appreciated that the photodetector may be any suitable optical detection device including photomultiplier tubes, photovoltaic cells, photoresistors, phototransistors, charge coupled devices, image sensors, or the like.

The computing device 640 of the structural health monitoring system 600 may be any suitable device including servers, desktop computers, notebook computers, netbook computers, tablet computing devices, pad computing devices, personal digital assistants (PDAs), smart phones, digital readers, or combinations thereof. The computing device 640 may include one or more processors 650, one or more input output (I/O) interfaces 652, one or more communications interfaces 654, one or more storage devices 656, and one or more memories 660. It will be appreciated that the computing device 640 may include other components or elements that enable the computing device 640 to perform the methods and processes described herein in accordance with embodiments of the disclosure.

The one or more processors 650 may be configured to execute and/or operate one or more instructions, applications, and/or software stored in the memory 660 of the computing device 640 to provide structural health monitoring functionality. The processors 650 may further be configured to receive input from or provide output to user interfaces of the computing device 640.

In some examples, the one or more processors 650 of the computing device 640 may be implemented as appropriate in hardware, software, firmware, or combinations thereof. Software or firmware implementations of the one or more processors 650 may include computer-executable or machine-executable instructions written in any suitable programming language to perform the various functions described. Hardware implementations of the processors 650 may be configured to execute computer-executable or machine-executable instructions to perform the various functions described. The one or more processors 650 may include without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The computing device 640 may also include a chipset (not shown) for controlling communications between the one or more processors 650 and one or more of the other components of the computing device 640. The one or more processors 650 may also include one or more application specific integrated circuits (ASICs) or application specific standard products (ASSPs) for handling specific data processing functions or tasks.

The memory 660 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof. The memory 660 may store program instructions that are loadable and executable on the processor(s) 650, as well as data generated or received during the execution of these programs.

Turning to the contents of the memory 660 in more detail, the memory 660 may include an operating system (O/S) 662, applications 664, an optical signal module 666, and/or a structural health module 668. Each of the modules and/or software may provide functionality for the computing device 640, when executed by the processors 650. The modules and/or the software may or may not correspond to physical locations and/or addresses in memory 660. In other words, the contents of each of the modules may not be segregated from each other and may, in fact, be stored in at least partially interleaved positions on the memory 660.

The O/S 662 may have one or more operating systems stored thereon. The processors 650 may be configured to access and execute one or more of the O/S 662 to operate the system functions of the computing device 640. System functions, as managed by the O/S 662, may include memory management, processor resource management, driver management, application software management, system configuration, and the like. The O/S may be any variety of suitable operating systems including, but not limited to, Google® Android®, Microsoft® Windows®, Microsoft® Windows® Server®, Linux, Apple® OS-X®, Apple® iOS®, or the like. The O/S 662 may further be utilized in structural health assessment and monitoring. In other words, the O/S 662 may be the framework under which the structural health monitoring system 600 may interact with users of the structural health monitoring system 600.

The applications module 664 may have one or more software applications stored thereon that may be accessed and executed by the processors 650 to provide the computing device 640 functionality and services. The one or more applications 664 may be run on the computing device 640 to process files and data locally on the computing device 640 or remotely from the computing device 640. The applications of the application module 664 may include any suitable applications, such as computational software, word processing software, database software, or the like. In certain embodiments, the applications module 664 may include one or more applications for determining the structural health of one or more structures, based on inputs from one or more photodetectors 630.

The optical signal module 666 may have stored thereon instructions and/or applications that when executed by processors 650, may provide various functionality associated with analyzing the output signal of the photodetector 630. The photodetector signal 630 may be an electrical signal associated with the optical output 620 of the TSR 410 produced in response to a mechanical event detected by the triboluminescent optical fiber sensor 120. The computing device 640 may be configured to receive the electrical signal from the photodetector and determine the type of mechanical event that produced the signal. In other words, the processors 650, based at least in part on one or more models and/or algorithms, may be able to ascertain the nature of damage and/or mechanical event imparted on the structure on which the triboluminescent optical fiber sensor 120 is monitoring. Additionally, the processors 650 may be able to assess the magnitude of a detected mechanical event on the structure on which the triboluminescent optical fiber sensor 120 is monitoring. In certain embodiments, the instructions stored in the optical signal module 666 may enable the computing device 640 and the processors 650 thereon to store a log and/or a time series of mechanical events detected using the triboluminescent optical fiber sensor 120. For example, a time series of mechanical events with predicted type of event, such as a crack propagation or flexing, as well as the magnitude of the mechanical event, may be stored. This information may be stored in the memory 660 or other suitable storage location, such as an external storage device or on the cloud. In certain embodiments, the information may be communicated by the computing device 640 via one or more networks and/or communicative links to an external server or other entity.

The structural health monitoring module 668 may have instructions and/or applications stored therein that when executed by the processors 650, the computing device 640 may be configured to analyze the signals produced by the triboluminescent optical fiber sensor 120 and received by the computing device 640 via the photodetector 630. In one aspect, the processors 650 may be configured to analyze one or more signals indicative of mechanical event and predict a probability of structural failure or the failure of a component of the monitored structure. The structural health monitoring module may include models and/or algorithms that may identified in predicting the failure of structural components that are being monitored. For example, the processors 650 may consider time series signals over a relatively long period of time, from the triboluminescent optical fiber sensor 120 and predict a probability of fatigue related failure of an associated structure or a portion thereof. In certain embodiments, the health monitoring module 668 may provide a user of the structural health monitoring system 600 with an indication of the structural health of a monitored structure. For example, the processors 650 may display one or more received triboluminescent optical fiber sensor 120 signals on an output component, such as a display screen, of the computing device 640. Additionally, the processors 650 may provide one or more alarms if a mechanical event of a relatively high magnitude is detected or if the structural health monitoring system 600 determines that the risk of structural failure of a monitored structure or a portion thereof is greater than a predetermined threshold level.

It will be appreciated that there may be overlap in the functionality of the instructions stored in the O/S module 662, applications module 664, optical signal module 666, and the structural health module 668. In fact, the functions of the four aforementioned modules 662, 664, 666, 668 may interact and cooperate seamlessly under the framework of the computing device 640. Indeed, each of the functions described for any of the modules 662, 664, 666, 668 may be stored in any other module 662, 664, 666, 668 in accordance with certain embodiments of the disclosure. Further, in certain embodiments, there may be one single module that includes the instructions, programs, and/or applications described within the O/S module 662, applications module 664, optical signal module 666, and the structural health module 668.

It will be appreciated that while a physical communicative link is depicted between the photodetector 630 and the computing device 640, there may be any suitable communicative link. For example, there may be a wireless link between the photodetector 630 and the computing device 640 in certain embodiments of the disclosure. Furthermore, it will be appreciated that the computing device 640 may receive signals from more than one photodetector 630 and/or associated triboluminescent optical fiber sensors 120. For example, a bridge 110 may have multiple triboluminescent optical fiber sensors 120 embedded therein and a single computing device 640 may monitor all of the triboluminescent optical fiber sensors 120 associated with that particular bridge 110. Further still, a single computing device 640 may be used to monitor multiple monitored structures each with one or more triboluminescent optical fiber sensors 120 embedded therein or provided thereon.

Figure 7:
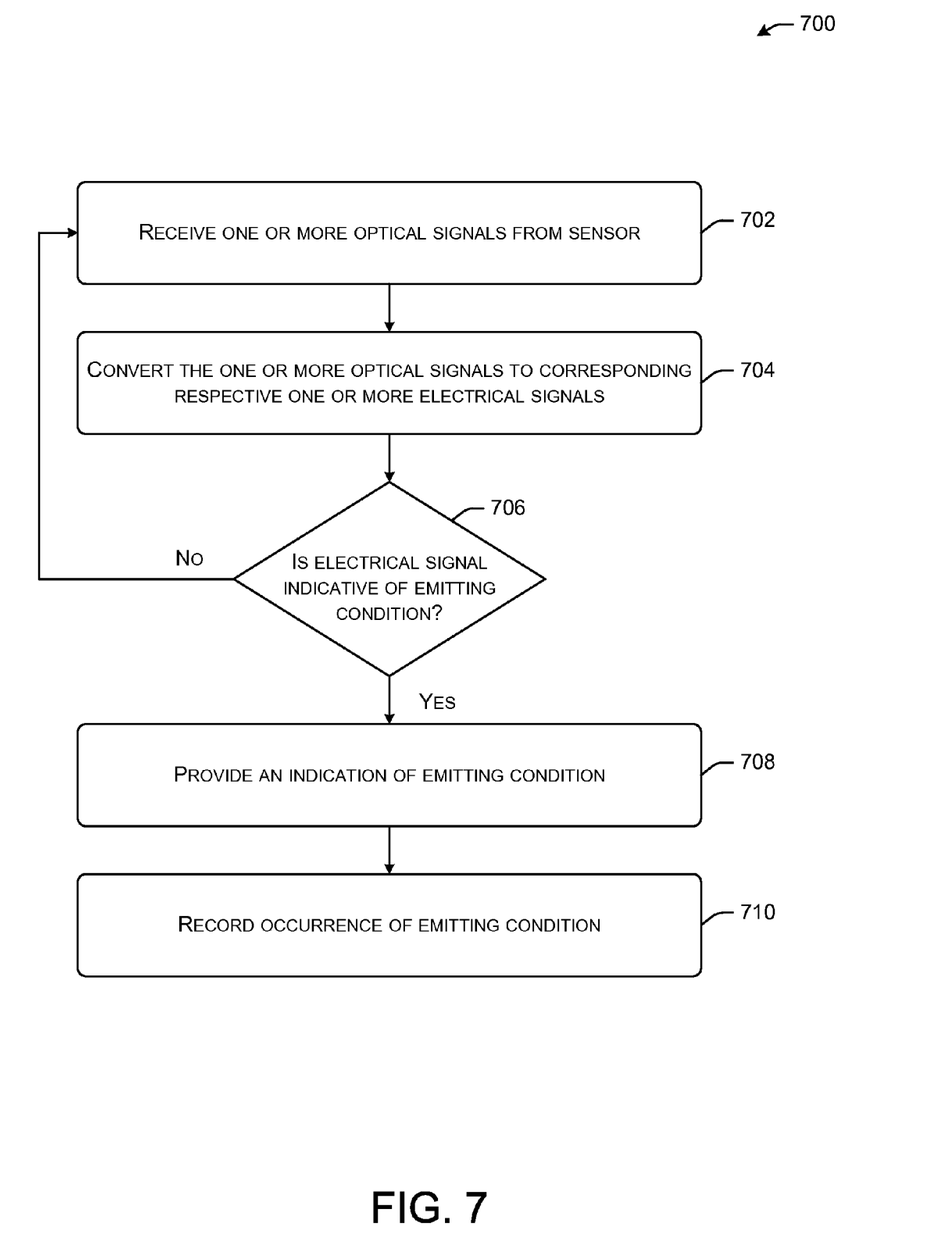
FIG. 7 is a flow diagram depicting an example method of providing structural health monitoring using the example structural health monitoring system of FIG. 6, in accordance with embodiments of the disclosure.

Referring now to FIG. 7, an example method 700 of providing structural health monitoring using the example structural health monitoring system 600 of FIG. 6, in accordance with embodiments of the disclosure are discussed. At block 702, one or more optical signals may be received from the triboluminescent optical fiber sensor 120. As discussed above, the one or more optical signals may be indicative of mechanical energy being imparted to the triboluminescent optical fiber sensor 120 from material surrounding and/or in proximity of the triboluminescent optical fiber sensor 120. In some cases, the signal may also be indicative of damage to the triboluminescent optical fiber sensor 120. In other cases, the signal may not be indicative of damage to the triboluminescent optical fiber sensor 120. In addition, in certain embodiments the signal may be indicative of damage to the structure being monitored by the triboluminescent optical fiber sensor 120. In other cases, the signal may be indicative of stressing of the structure being monitored by the triboluminescent optical fiber sensor 120. This stressing of the monitored structure may, over time, lead to the degradation of the structural integrity of the monitored structure. In yet other cases, the detected signal may be of a type and/or magnitude that may not be indicative of critical damage or fatigue of the monitored structure. It will be appreciated that the one or more signals generated by the triboluminescent optical fiber sensor 120 in response to a mechanical event may be generated at the TSR 410 of the triboluminescent optical fiber sensor 120.

At block 704, the one or more optical signals may be converted to corresponding respective one or more electrical signals. As described in conjunction with FIG. 6, the photodetector 630, such as a photodiode, may be used to convert the one or more optical signals to corresponding respective one or more electrical signals. In some cases, the electrical signals may have different levels of noise and/or signal integrity compared to the corresponding respective optical signals. These differences may, in certain cases, be a result of bandwidth limitations of the photodetector and/or noise associated with optical-to-electrical signal conversion. In some cases, the conversion may lead to some rounding and/or ringing of the electrical signals compared to the corresponding optical signals.

At block 706, it may be determined the electrical signal is indicative of an emitting condition. In this case, the emitting condition may be indicative of a mechanical force imparted to the triboluminescent optical fiber sensor 120. The mechanical force may be a result of damage and/or forces imparted to the structure that is being monitored. At block 706, if it is determined that the electrical signal is not indicative of an emitting condition, then the method 700 may return to block 702 to receive more optical signals. If, however, at block 706 it is determined that the electrical signal is indicative of an emitting condition, then at block 708 an indication of the emitting condition may be provided. In certain case, this process may entail indicating to a user of the structural health monitoring system 600 that an emitting condition has occurred at one or more of the triboluminescent optical fiber sensors 120 associated with the structural health monitoring system 600. In certain embodiments, an indication of the type of event sensed may be determined and provided. For example, the structural health monitoring system 600 may ascertain if the mechanical event is a crack propagation event and may indicate the same to a user of the structural health monitoring system 600. At block 710, the occurrence of the emitting condition may be recorded. This recordation may be at the computing device 640 or a remote location to the computing device 640.

Several features of the triboluminescent optical fiber sensor 120 as disclosed herein will be apparent in light of current triboluminescent devices. Existing triboluminescent-based sensors under development utilize dispersion of triboluminescent materials throughout the host material or the material to be structurally monitored. This may adversely affect the properties and performance of the host material. The triboluminescent optical fiber sensor 120, as described herein, on the other hand may be an integrated sensing and transmission unit consisting of a coating of triboluminescent material in a polymer matrix (binder) to form the TSR 410 for sensing and the optical fiber 400 for transmission. This enables a network of 'sensing nerves' to be formed in the structure for distributed sensing similar to the HNS. It also enables one to independently design, characterize and tailor the properties of the triboluminescent optical fiber sensor 120 to better meet the needs of the host structure. This is not possible with existing approaches with the TL materials dispersed throughout the host structural material or in thin film. The integrated sensing and transmission approach of the triboluminescent optical fiber sensor 120 eliminates or greatly reduces the problems associated with parasitic weight and filtration during composite fabrication.

The integrated sensing and transmission approach employed in the triboluminescent optical fiber sensor 120 makes signal transmission from damaged host material possible. This has been a major limiting factor in existing approaches to triboluminescent-based sensing, as triboluminescent signals generated due to damage in the host structure by widely dispersed triboluminescent crystals are usually too far from the transmission system for them to be detected in conventional triboluminescent sensors. The triboluminescent optical fiber sensor 120, however, can be located in regions of high damage potential and can be successfully used in opaque matrix structures like concrete and carbon fiber reinforced polymer. Through the triboluminescent optical fiber sensor 120, a sensor system with enhanced side-coupling of TL signals in to the optical fiber is provided. The triboluminescent optical fiber sensor 120 further provides properties of optical fibers such as relatively light weight, small size, immunity to electromagnetic interference and capacity for distributed sensing. The triboluminescent optical fiber sensor 120, therefore, has the potential for wireless, in-situ, real time and distributed (WIRD) sensing.

While other TL based sensors seek to determine the location of damage by using color dyes with different wavelengths, the triboluminescent optical fiber sensor 120 can be deployed in different approaches including, but not limited to, multidimensional sensor array (particularly 2-dimensional), changing the wavelength of the TL crystals by doping with different elements, and triboluminescent optical fiber sensor 120 application in fiber reinforced polymer (FRP). Various efficient TL materials, as well as both micro- and nano-sized particles, may be used to make the triboluminescent optical fiber sensor 120.

In a further embodiment, a micro-sized triboluminescent optical fiber sensor 120 may be weaved into the fibers of FRP during fiber manufacture. This can involve the use of nano-sized TL crystals in the construct of the triboluminescent optical fiber sensor 120. Therefore, easy-to-fabricate and economical triboluminescence multifunctional composites (TMC) with distributed, self-sensing and structural capabilities may be provided.

While certain embodiments of the invention have been described in connection with what can be presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

We claim:

1. An apparatus, comprising:
   an optical fiber comprising an outer surface extending a length of the optical fiber and a first portion and a second portion along the length of the optical fiber; and,
   a triboluminescent coating coated directly on at least part of the outer surface in the first portion of the optical fiber,
   wherein the triboluminescent coating provides an optical emission when subjected to an emitting condition and at least a portion of the optical emission is received by the first portion of the optical fiber and guided through the second portion of the optical fiber,
   and wherein the first portion with the triboluminescent coating is configured to be embedded in a surrounding material, the surrounding material containing no triboluminescent material.

2. The apparatus of claim 1, wherein the optical fiber is at least one of: (i) a polymer optical fiber; (ii) a glass-based optical fiber; (iii) a single mode optical fiber; or (iv) a multi-mode optical fiber.

3. The apparatus of claim 1, further comprising jacket disposed over at least a segment of the second portion.

4. The apparatus of claim 1, wherein the triboluminescent coating is an epoxy dispersed with triboluminescent crystals.

5. The apparatus of claim 4, wherein the triboluminescent crystals comprise ZnS:Mn crystals.

6. The apparatus of claim 1, wherein the emitting condition arises when the triboluminescent coating is at least one of: (i) stressed; (ii) pulled apart; (iii) ripped; (iv) scratched; (v) rubbed; or (vi) fractured.

7. The apparatus of claim 1, wherein the optical emission is received by the first portion of the optical fiber through the outer surface of the optical fiber in the first portion.

8. A system comprising:
   a host material, the host material not containing any triboluminescent material;

at least one sensor embedded within the host material; and,
at least one photodetector, wherein each of the at least one photodetector is optically coupled to each of the at least one sensor,
wherein each of the at least one sensor comprises:
an optical fiber comprising an outer surface extending a length of the optical fiber and a first portion and a second portion along the length of the optical fiber; and,
a triboluminescent coating coated directly on the outer surface in the first portion of the optical fiber,
wherein the triboluminescent coating provides an optical emission when subjected to an emitting condition and at least a portion of the optical emission is received by the first portion of the optical fiber and guided through the second portion of the optical fiber.

9. The system of claim 8, wherein the optical fiber is at least one of: (i) a polymer optical fiber; (ii) a glass-based optical fiber; (iii) a single mode optical fiber; or (iv) a multi-mode optical fiber.

10. The system of claim 8, further comprising jacket disposed over at least a segment of the second portion.

11. The system of claim 8, wherein the triboluminescent coating is an epoxy dispersed with triboluminescent crystals.

12. The system of claim 11, wherein the triboluminescent crystals comprise ZnS:Mn crystals.

13. The system of claim 8, wherein the emitting condition arises when the triboluminescent coating is at least one of: (i) stressed; (ii) pulled apart; (iii) ripped; (iv) scratched; (v) rubbed; or (vi) fractured.

14. The system of claim 8, wherein the optical emission is received by the first portion of the optical fiber through the outer surface of the optical fiber in the first portion.

15. The system of claim 8, further comprising at least one processor running software and coupled to each of the at least one photodetector to determine an occurrence of the emitting condition.

16. A method comprising:
providing an optical fiber comprising an outer surface extending a length of the optical fiber and a first portion and a second portion along the length of the optical fiber;
providing a triboluminescent coating coated directly on the outer surface in the first portion of the optical fiber; and,
communicatively coupling the second portion of the optical fiber to at least one photodetector so the triboluminescent material emits an optical emission when subjected to an emitting condition and at least a portion of the optical emission can be received by the first portion of the optical fiber and guided to the at least one photodetector via the second portion of the optical fiber.

17. The method of claim 16, further comprising determining an occurrence of the emitting condition based at least in part from the at least a portion of the optical emission.

18. The method of claim 16, wherein the optical fiber is at least one of: (i) a polymer optical fiber; (ii) a glass-based optical fiber; (iii) a single mode optical fiber; or (iv) a multi-mode optical fiber.

19. The method of claim 16, further comprising jacket disposed over at least a segment of the second portion.

20. The method of claim 16, wherein the triboluminescent coating is an epoxy dispersed with triboluminescent crystals.

21. The method of claim 20, wherein the triboluminescent crystals comprise ZnS:Mn crystals.

22. The method of claim 16, wherein the emitting condition arises when the triboluminescent coating is at least one of: (i) stressed; (ii) pulled apart; (iii) ripped; (iv) scratched; (v) rubbed; or (vi) fractured.

23. The method of claim 16, wherein the optical emission is received by the first portion of the optical fiber through the outer surface of the optical fiber in the first portion.

* * * * *